United States Patent
Sherman

(10) Patent No.: US 6,507,172 B2
(45) Date of Patent: Jan. 14, 2003

(54) UNIVERSAL SERIAL BUS POWERED BATTERY CHARGER

(75) Inventor: Leonard Harris Sherman, Los Altos, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 09/813,040

(22) Filed: Mar. 19, 2001

(65) Prior Publication Data

US 2002/0130638 A1 Sep. 19, 2002

(51) Int. Cl.⁷ .................................................. H02J 7/00
(52) U.S. Cl. ...................................... 320/134; 320/128
(58) Field of Search ................................ 320/134, 128, 320/149, 150; 323/273, 277

(56) References Cited

U.S. PATENT DOCUMENTS

| | | | |
|---|---|---|---|
| 6,184,652 B1 * | 2/2001 | Yang | 320/110 |
| 6,211,649 B1 * | 4/2001 | Matsuda | 320/115 |
| 6,253,329 B1 * | 6/2001 | Kang | 713/300 |
| 6,347,029 B1 * | 2/2002 | Ouyang et al. | 361/93.9 |

FOREIGN PATENT DOCUMENTS

| | | |
|---|---|---|
| EP | 0889659 | 1/1999 |
| EP | 1198049 | 4/2002 |
| WO | WO 9621900 | 7/1996 |
| WO | WO 0217460 | 2/2002 |

* cited by examiner

*Primary Examiner*—Edward H. Tso
*Assistant Examiner*—Lawrence Luk
(74) *Attorney, Agent, or Firm*—Blakely, Sokoloff, Taylor & Zafman LLP

(57) ABSTRACT

Universal serial bus powered battery charger primarily intended for use in battery powered hand-held and other portable devices to charge the battery or batteries within the battery powered device when the same is connected to a host device, powered hub or a bus powered hub through a universal serial bus (USB) port. The battery charger includes one or more current limits to conform to the universal serial bus current supply limit set in the USB specification. Any of the universal serial bus voltage and current limits may be used to charge batteries in the battery powered device, such as single cell lithium-ion batteries. Various features are disclosed.

26 Claims, 2 Drawing Sheets

UNIVERSAL SERIAL BUS POWERED BATTERY CHARGER

BACKGROUND OF THE INVENTION

1. Field of the Invention

The present invention relates to the field of power storage unit charging devices.

2. Prior Art

Many battery powered devices such as hand-held and other portable devices currently include a universal serial bus (USB) port for connecting to other devices having a universal serial bus port, such as hosts, powered hubs and bus powered hubs, for communication with a host or local area network. Being battery powered, these hand-held and other portable devices require their batteries to be charged periodically, typically through an AC to DC converter plugged into an AC source. Such battery chargers work well, though are inconvenient to carry around with the battery powered device, particularly as the battery powered devices themselves become smaller and smaller and easily carried on ones person.

BRIEF SUMMARY OF THE INVENTION

Universal serial bus powered battery charger primarily intended for use in battery powered hand-held and other portable devices to charge the battery or batteries within the battery powered device when the same is connected to a host device, powered hub or a bus powered hub through a universal serial bus (USB) port. The battery charger includes one or more current limits to conform to the universal serial bus current supply limit set in the USB specification. Any of the universal serial bus voltage and current limits may be used to charge batteries in the battery powered device, such as single cell lithium-ion batteries. Various features are disclosed.

DETAILED DESCRIPTION OF THE PREFERRED EMBODIMENT

The universal serial bus powered battery charger of the preferred embodiment is intended for charging a single cell lithium-ion battery, or a single cell of a multi-cell lithium-ion battery system at any one time in battery powered devices through a universal serial port connection with a non-battery powered host or network hub. Accordingly, the preferred embodiment will be described in that context, though the invention itself is not to be so limited.

Figure 1:
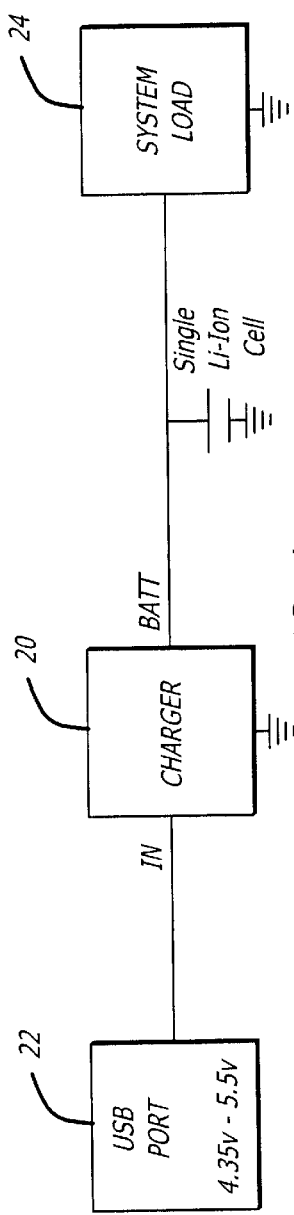
FIG. 1 is a block diagram illustrating a typical system utilizing the present invention.

Referring now to FIG. 1, a block diagram illustrating a typical use of the present invention may be seen. The charger 20 of the present invention is used in a battery powered portable device between a USB port 22 on the device and the battery powered system load 24, which load may be any of various types of devices using USB ports to enable the devices to be connected to a host, a host powered hub or a bus powered hub. The preferred embodiment of the invention is adapted for charging a single lithium-ion cell 26, though could be adapted for charging other types of batteries, including charging of multiple lithium-ion cells, one at a time, or other rechargeable batteries as desired. Further or course, while charging the battery in the battery powered device is the primary intended use for the charger 20, it should be noted that the charger 20 may also be used in conjunction with other power sources, such as by way of example, a conventional AC adapter converting 115 volts AC power to an appropriate DC voltage for battery charging purposes.

Figure 2:
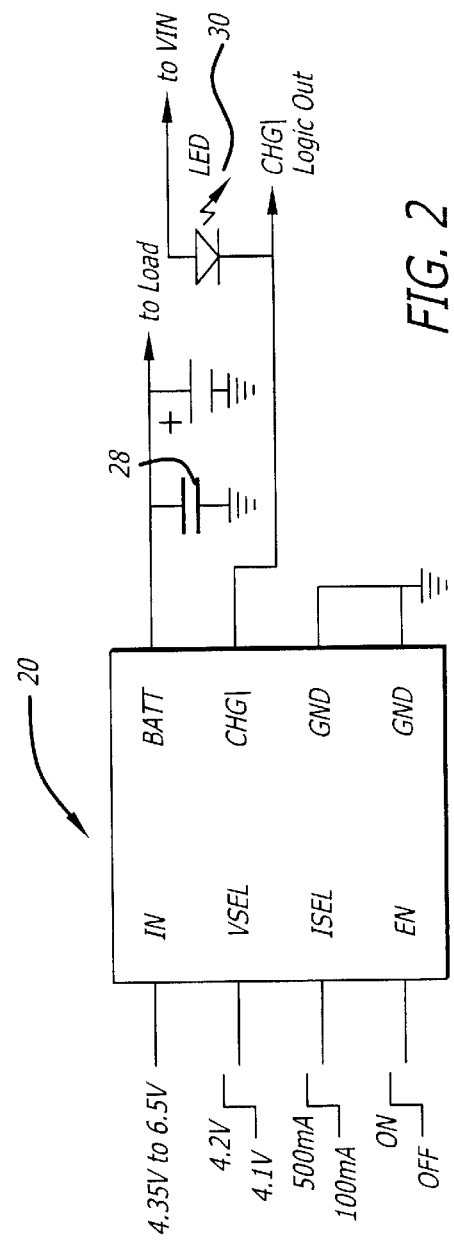
FIG. 2 is an illustration showing the pinouts used with an exemplary embodiment of the present invention.

A preferred embodiment of the charger 20 in integrated circuit form for charging a single cell lithium-ion battery is illustrated in FIG. 2. As shown therein, the charger includes an input terminal IN for connection to the power line on the USB port, and a ground connection GND for connecting to the ground line of the USB port, the ground for the system load 24 and the low side of battery or cell 26 (see FIG. 1). The charger further includes a battery connection BATT to connect to the battery 26, with a capacitor 28 typically being used for noise reduction purposes. The embodiment illustrated in FIG. 2 also includes a logical enable signal EN for turning the charger on and off, a charging voltage select line VSEL for selecting between charging to a regulated voltage of 4.1 volts or 4.2 volts. Finally, the preferred embodiment of FIG. 2 includes an output CHG that is an open drain output going low when charging by the charger begins. CHG goes high impedance when the battery voltage reaches the battery regulation voltage, at which voltage the charger transitions from a constant current mode to a fixed voltage mode. The signal on terminal CHG may be used for such purposes as turning on a light emitting diode 30, as illustrated in FIG. 2, when CHG goes low. The signal ISEL is a current select, selecting between a current of 100 milliamps and a current of 500 milliamps. In that regard, hosts or powered hubs can supply up to 500 milliamps from a minimum of 4.5 volts at the end of the cable, whereas bus powered hubs can supply to the 100 milliamps to low power functions from a minimum of 4.35 volts at the cable end. In use, the charger 20 of the present invention normally is incorporated into a system which will itself determine the current capability by polling the USB host to determine if the USB is capable of providing 500 milliamps or only 100 milliamps, and controlling the SELI logic level accordingly.

Figure 3:
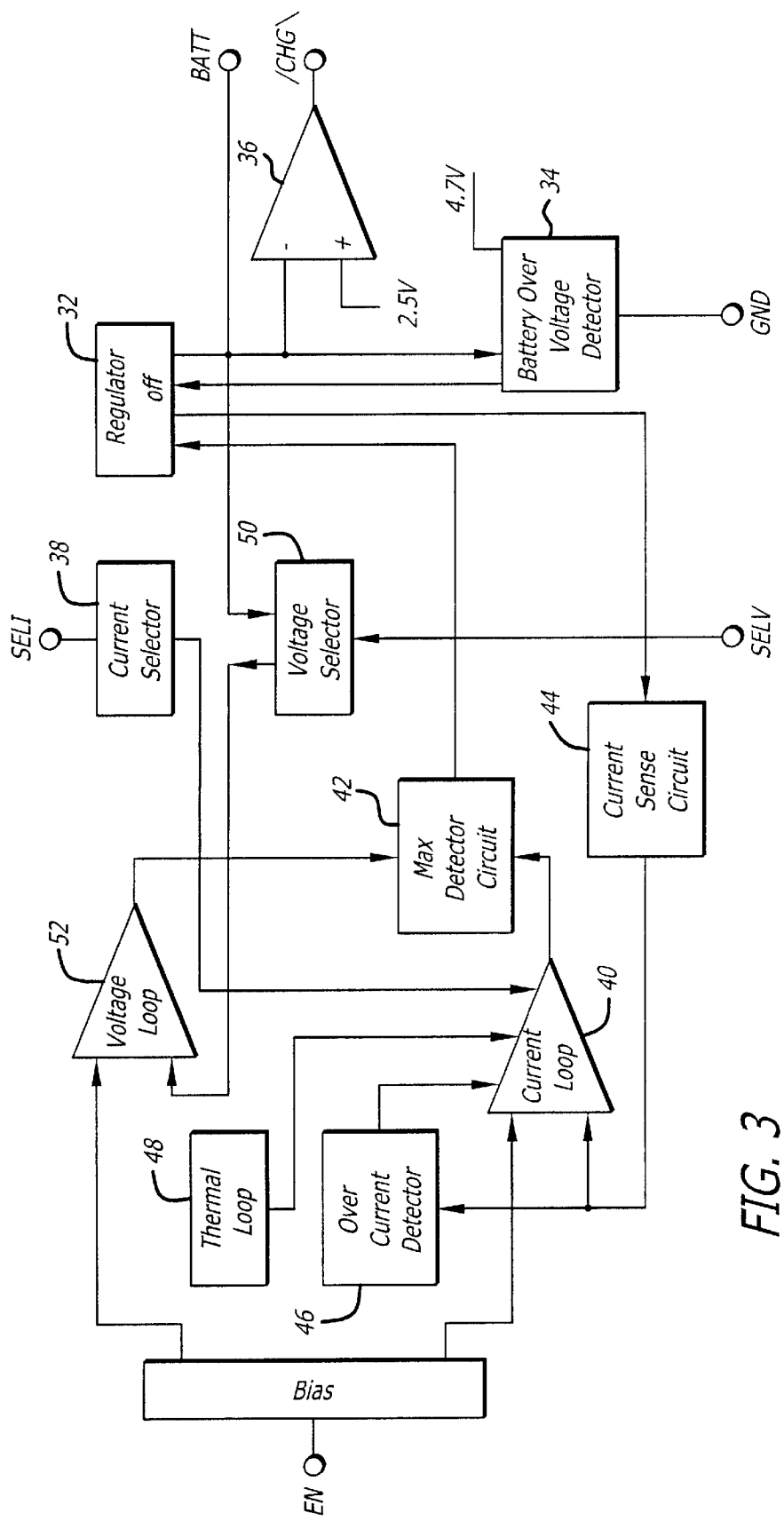
FIG. 3 is a block diagram illustrating the circuitry within the exemplary charger of FIGS. 1 and 2.

Now referring to FIG. 3, a block diagram of a preferred embodiment of charger 20 may be seen. The charger includes a linear regulator 32 that controls the output terminal BATT based on one of various conditions. In particular, the voltage on terminal BATT is coupled to a battery over-voltage detector 34, which in the preferred embodiment compares the battery voltage with a voltage limit of 4.7 volts, providing a signal to the regulator 32 to turn the same off if the battery voltage exceeds a 4.7 volt reference voltage. Also, the regulator 32 will sense the output voltage on the BATT terminal to detect battery voltages of less then 2.5 volts in the exemplary embodiment, with the regulator limiting the output current to the BATT terminal to 40 milliamps for a battery preconditioning mode for fairly thoroughly discharged batteries. Under these conditions, the CHG signal output from comparator 36 will be high (high impedance), switching to a low state when a 2.5 volt battery voltage is reached, indicating to regulator 32 that it is no longer limited to the 40 milliamp charging current.

Once out of the preconditioning mode, the charger of the exemplary embodiment will charge a battery connected to the BATT terminal to 4.1 or 4.2 volts, as determined by the signal on the voltage select terminal SELV at a current of 100 milliamps or 500 milliamps, dependent upon the logic signal connected to the current select terminal SELI. Once the battery is charged, the selected voltage regulator 32 will maintain that voltage using a current which will depend on the load on the battery, if any, with an upper current limit of 100 milliamps or 500 milliamps, as set by the current select signal SELI.

When the state of the SELI terminal is set, the current selector 38 sets a current limit output for the current loop amplifier 40, providing an output to the maximum detector circuit 42. The actual current is sensed by current sense circuit 44 associated with regulator 32, providing an input signal to the current loop amplifier 40 and to an over-current detector 46, also limiting the output of the current loop amplifier 40. Also provided is a thermal loop 48 comprising a temperature sensitive device, also providing a limit to current loop amplifier 40. In particular, in the preferred embodiment the thermal loop 48 provides an overriding current limit to the current loop 40 to further limit the current in the current loop, if necessary, to limit the maximum temperature of the integrated circuit. In the preferred embodiment, normally the thermal loop will not be activated, as the combination of the typical power dissipation in the integrated circuit and a reasonable ambient temperature will keep the temperature of the integrated circuit well below its design limit. However, given the size limitations normally encountered in battery operated devices, integrated circuits of the present invention will normally be made available in small package configurations, limiting their ability to dissipate heat. This, in combination with a substantial upper charging current value (500 milliamps in the preferred embodiment) and a particularly high input voltage IN, whether from a particularly high USB supply voltage or from some other supply voltage source for which the present invention is being used, may cause the temperature limit to be reached and the thermal loop 48 to become active to control (limit) the charging current as necessary to limit the integrated circuit temperature as desired. Other factors, of course, which affect whether the thermal loop is active include the ambient temperature as well as the proximity of the integrated circuit to other heat sources within the portable device and the ability of the portable device to dissipate such heat.

As stated before, the voltage on the voltage select pin SELV selects between a regulated voltage of 4.1 volts and 4.2 volts in the exemplary embodiment. Depending upon this input, the voltage selector 50 compares the output voltage of the regulator 32 on the BATT terminal with the regulated voltage selected to control a voltage loop 52, also providing a limit signal to the detector circuit 42. If the output voltage is less than the voltage selected, the detector circuit 42 will be controlled by the current loop, with a 100 milliamp or 500 milliamp current limit in the exemplary embodiment unless further limited by the thermal loop 48. However, when the output voltage on the BATT terminal reaches the regulated voltage selected by the control signal on the SELV terminal, the voltage loop 52 will control the detector circuit 42, and thus regulator 32, to maintain the regulated voltage, decreasing the output current below any limit set by the current loop 40 as may be required to not overshoot the commanded regulated output voltage.

The entire integrated circuit is controlled by an enable signal on the EN terminal that controls power to the rest of the circuits and establishes bias voltages as required. In the powerdown mode (the voltage on the EN terminal being low), various circuits shown in FIG. 3 are in a powerdown condition. In the exemplary embodiment, the circuits are designed so that the leakage from a battery charged by the battery charger of the present invention back through the charger when powered down is on the order of microamps, preferably less than approximately 2 microamps. Similarly, when the device in which the present invention charger is used is not plugged into a USB connection, the input voltage IN to the charger will be zero. In this condition, it is also desired to keep the leakage current low, preferably less than approximately 5 microamps in the exemplary embodiment.

There has been described herein a new and unique battery charger, the preferred embodiment being intended for the automatic charging of a battery in a battery operated device when plugged into a USB connection. While a preferred embodiment of the invention has been disclosed and described in detail herein, it has been so described for purposes of illustration and not for purposes of limitation. Accordingly various changes in form and detail may be made in the invention without departing from the scope and spirit thereof.

What is claimed is:

1. The improvement comprising:
   in a battery operated device having a Universal Serial Buss (USB) port, a linear voltage regulator coupled between a power line of the USB port and a battery in the battery operated device, the voltage regulator having a current limit input, the voltage regulator limiting the current delivered from the power line of the USB port to the battery responsive to a control signal on the current limit input.

2. The improvement of claim 1 wherein the voltage regulator further having a regulation voltage input, the voltage regulator limiting the voltage to the battery to a regulated voltage responsive to a control signal on the regulation voltage input.

3. The improvement of claim 1 wherein the voltage regulator includes an output indicating whether the charger is operating.

4. The improvement of claim 1 wherein the charger includes an enable control for enabling and disabling the voltage regulator.

5. The improvement of claim 1 wherein the battery charger further includes circuitry responsive to the battery voltage to limit the current delivered from a power line of the USB port to the battery below the limits set by the control signal on the current limit input when the battery voltage is below a predetermined voltage.

6. The improvement of claim 1 wherein the battery charger further includes circuitry responsive to the battery voltage to limit the current delivered from the power line of the USB port to the battery to a value below the limits settable by the control signal on the current limit input when the battery voltage is below a predetermined voltage.

7. The improvement of claim 1 wherein the voltage regulator further comprises a thermal control for limiting the current delivered to the battery to limit the temperature of the voltage regulator.

8. The improvement comprising:
   in a battery operated device powered by a lithium-ion battery having a Universal Serial Buss (USB) port, a linear voltage regulator coupled between a power line of the USB port and a cell of the lithium-ion battery in the battery operated device, the voltage regulator having a current limit input, the voltage regulator limiting the current delivered from the power line of the USB port to the battery to approximately 100 milliamps or 500 milliamps responsive to a control signal on the current limit input.

9. The improvement of claim 8 wherein the voltage regulator further having a regulation voltage input, the voltage regulator limiting the voltage to the battery cell to a regulated voltage of approximately 4.1 or 4.2 volts responsive to a control signal on the regulation voltage input.

10. The improvement of claim 8 wherein the voltage regulator includes an output indicating whether the charger is operating.

11. The improvement of claim 8 wherein the charger includes an enable control for enabling and disabling the voltage regulator.

12. The improvement of claim 8 wherein the battery charger further includes circuitry responsive to the battery cell voltage to limit the current delivered from a power line of the USB port to the battery cell to below the limit set by the control signal on the current limit input when the battery cell voltage is below a predetermined voltage.

13. The improvement of claim 8 wherein the battery charger further includes circuitry responsive to the battery cell voltage to limit the current delivered from the power line of the USB port to the battery cell to a value below the limits settable by the control signal on the current limit input when the battery cell voltage is below a predetermined voltage.

14. The improvement of claim 8 wherein the voltage regulator further comprises a thermal control for limiting the current delivered to the battery cell to limit the temperature of the voltage regulator.

15. The improvement comprising:
in a battery operated device having a Universal Serial Buss (USB) port, a linear voltage regulator coupled between a power line of the USB port and a battery in the battery operated device, the voltage regulator having a current limit input, the voltage regulator limiting the current delivered from the power line of the USB port to the battery responsive to a control signal on the current limit input, the voltage regulator further having a regulation voltage input, the voltage regulator limiting the voltage to the battery to a regulated voltage responsive to a control signal on the regulation voltage input.

16. The improvement of claim 15 wherein the voltage regulator includes an output indicating whether the charger is operating.

17. The improvement of claim 15 wherein the charger includes an enable control for enabling and disabling the voltage regulator.

18. The improvement of claim 15 wherein the battery charger further includes circuitry responsive to the battery voltage to limit the current delivered from a power line of the USB port to the battery below the limits set by the control signal on the current limit input when the battery voltage is below a predetermined voltage.

19. The improvement of claim 15 wherein the battery charger further includes circuitry responsive to the battery voltage to limit the current delivered from the power line of the USB port to the battery to a value below the limits settable by the control signal on the current limit input when the battery voltage is below a predetermined voltage.

20. The improvement of claim 15 wherein the voltage regulator further comprises a thermal control for limiting the current delivered to the battery to limit the temperature of the voltage regulator.

21. The improvement comprising:
in a battery operated device powered by a lithium-ion battery having a Universal Serial Buss (USB) port, a linear voltage regulator coupled between a power line of the USB port and a cell of the lithium-ion battery in the battery operated device, the voltage regulator having a current limit input, the voltage regulator limiting the current delivered from the power line of the USB port to the battery to approximately 100 milliamps or 500 milliamps responsive to a control signal on the current limit input, the voltage regulator limiting the voltage to the battery cell to a regulated voltage of approximately 4.1 or 4.2 volts responsive to a control signal on the regulation voltage input.

22. The improvement of claim 21 wherein the voltage regulator includes an output indicating whether the charger is operating.

23. The improvement of claim 21 wherein the charger includes an enable control for enabling and disabling the voltage regulator.

24. The improvement of claim 21 wherein the battery charger further includes circuitry responsive to the battery cell voltage to limit the current delivered from a power line of the USB port to the battery cell to below the limit set by the control signal on the current limit input when the battery cell voltage is below a predetermined voltage.

25. The improvement of claim 21 wherein the battery charger further includes circuitry responsive to the battery cell voltage to limit the current delivered from the power line of the USB port to the battery cell to a value below the limits settable by the control signal on the current limit input when the battery cell voltage is below a predetermined voltage.

26. The improvement of claim 21 wherein the voltage regulator further comprises a thermal control for limiting the current delivered to the battery cell to limit the temperature of the voltage regulator.

* * * * *